Jan. 16, 1945. R. L. WEEKS ET AL 2,367,385
TREATMENT OF OILS
Filed Oct. 7, 1942
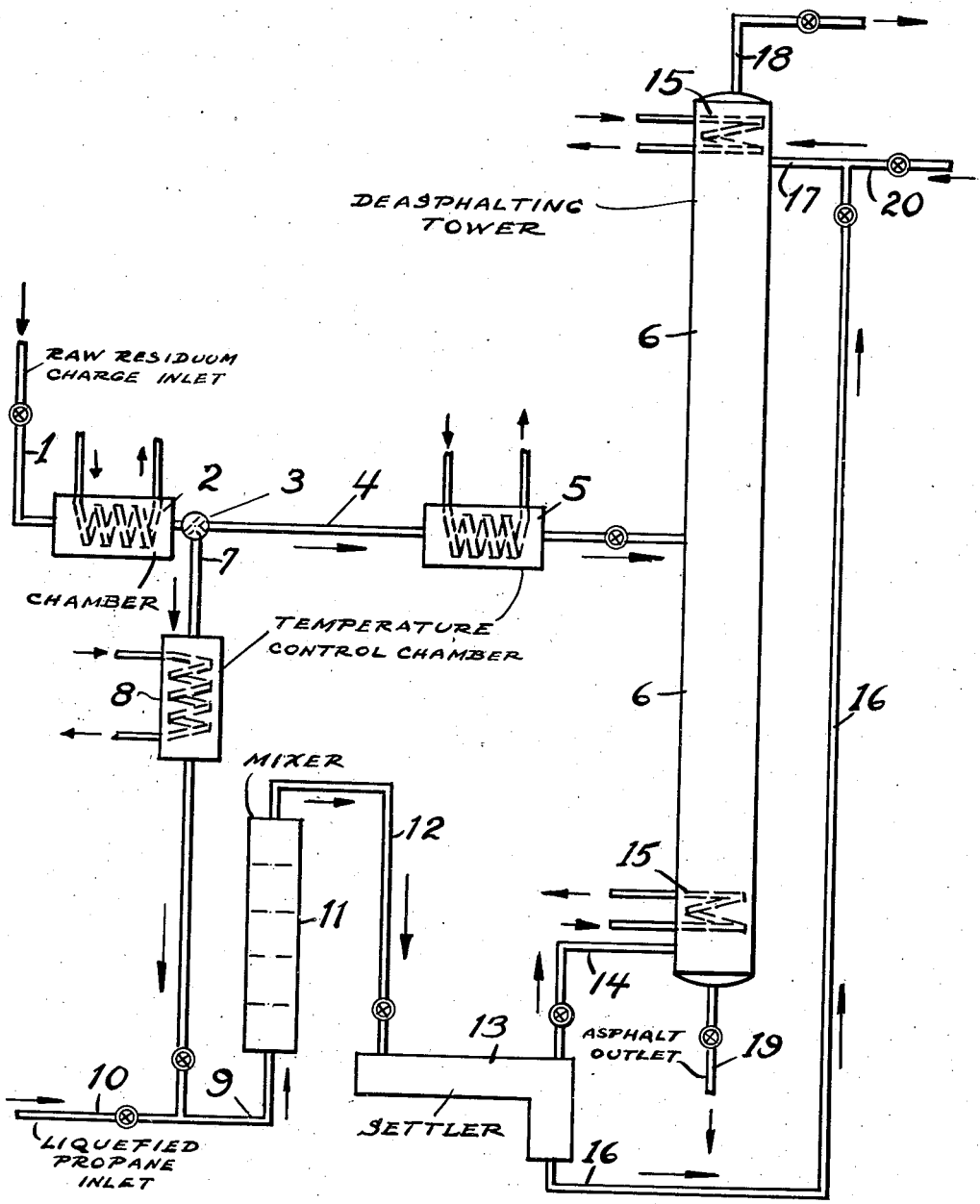
Robert L. Weeks
Burton C. Belden Inventors
By P. L. Young Attorney Patented Jan. 16, 1945

2,367,385

UNITED STATES PATENT OFFICE 2,367,385

TREATMENT OF OILS

Robert L. Weeks, Baton Rouge, La., and Burton C. Belden, Cranford, N. J., assignors to Standard Oil Development Company, a corporation of Delaware Application October 7, 1942, Serial No. 461,142

8 Claims. (Cl. 196—13)

This invention relates to the treatment of oils and more particularly to the treatment of heavy oils containing constituents of an asphaltic nature with a liquefied light gas hydrocarbon, such as propane, in order to separate said constituents of an asphaltic nature from the oil.

A customary manner of operating a countercurrent propane deasphalting tower is to inject the propane at the bottom and the residuum feed stream at a higher point somewhat removed from the tower top, and to employ a temperature gradient, i. e., increasing temperature, between this residuum feed point and the tower top. As a consequence of this type of operation, the heaviest components in the residuum charge, including all of the strictly asphaltic material, are precipitated near the point of feed injection and flow toward the bottom of the tower countercurrent to the ascending propane-rich phase. The remainder of the residuum charge becomes, at the residuum feed point, a part of the upflowing material; due, however, to the increasing temperature accompanying rise in the tower, further precipitation of the then remaining heaviest constituents in the charge stock is obtained in this part of the tower. This is a part of the mechanism whereby fractionation equivalent to several stages can be obtained in that part of the tower above the residuum feed point, which is a factor in obtaining relatively high degree of selectivity in the propane deasphalting operation.

Stokes' law gives the rate of fall of a small sphere in a viscous fluid and states that the settling rate of the particles will vary inversely according to the viscosity of the fluid and directly according to the gravity differential between the particles and the fluid medium; and in the propane precipitation of asphalt because the specific gravity of the material precipitated above the residuum feed point is appreciably less than that of the asphaltic precipitate obtained below this feed point, a considerably lower specific gravity differential exists between the downflowing and upflowing phases in the upper part of the tower which impairs the rate at which the two phases will counterflow in this region. The specific gravity differentials existing in the various parts of a tower operating in this manner are shown by the following data for the deasphalting of a Rodessa residuum having a 540 sec. viscosity at 210° F.

Propane treat—Vol. per cent on residuum 585

Tower top:
  Temperature, °F_____ 148
  Specific gravity:[1]
    Downflowing phase_____ 0.643
    Upflowing phase _____ 0.476

Differential _____ 0.167

Middle of tower (residuum feed point):
  Temperature, °F_____ 130
  Specific gravity:[1]
    Downflowing phase_____ 0.753
    Upflowing phase _____ 0.517

Differential _____ 0.236

Tower bottom:
  Temperature, °F_____ 130
  Specific gravity:[1]
    Downflowing phase_____ 0.808
    Upflowing phase _____ 0.469

Differential _____ 0.339

[1] Propane-containing basis, at indicated temperature.

A consequence of this situation is that the limiting point in the operation of a deasphalting tower, as shown by the tendency to flood (i. e., failure of the phases to counterflow), is usually found to be near the tower top, where relatively low specific gravity differentials are encountered.

It has now been discovered that the settling characteristics of the material precipitated above the residuum feed point may be improved, and the deasphalting tower capacity thereby substantially increased, by the addition of an essentially propane-insoluble ("third") component at a point near the tower top. This "third" component may be a propane-insoluble solid substance of suitable degree of subdivision and suitable specific gravity, as, for instance, falling in the range of 50–200 mesh and between perhaps 1.0 and 3.0 specific gravity. This added component may also be an essentially propane-insoluble liquid of sufficiently high specific gravity, as, for instance, between 0.8 and 2.0. A preferred type of material to employ as the added component is the precipitated phase obtained from a relatively selective propane precipitation operation, since this material will be (a) essentially oil-free and (b)

relatively easily wetted by, or miscible with, the material whose settling it is desired to improve, as a consequence of the small but definite propane content in the said precipitated phase. An example of this latter type of added material would be a propane precipitated asphaltic phase containing, for example, 20 vol. per cent of propane and 80% of high softening (above 200° F. softening point) asphalt. Such an asphaltic phase would have a specific gravity, at the usual tower deasphalting temperatures, in the range of 0.80 to 1.00.

This settling aid will, therefore, counterflow through the continuous propane-oil phase and in so doing will contact, agglomerate, and combine with the material which is incrementally precipitated in these regions. The net effect will be to increase particle size and specific gravity of the downflowing phase and thereby increase the effective specific gravity differential between the downflowing and upflowing phases, thus (1) improving settling of the precipitated material, (2) improving fractionation obtained between the two counterflowing phases, and (3) increasing the allowable throughput of the deasphalting tower.

Examples of solid materials which may be added as described above are adsorbents such as clay, bauxite, silica or alumina gel, spent decolorizing clay, etc.

The addition of the settling aid is preferably carried out continuously as by feeding onto an adjustable rotating disc which readily permits the feeding of any desired proportion of the material, or alternatively, the settling aid may be fed intermittently in small amounts but at sufficiently frequent intervals to give the effect of an almost continuous addition. As a further alternative the finely divided solid or other settling aid may be suspended in a small amount of oil or propane or mixture thereof, and continuously added in the form of a slurry. Normally, about 0.1 to 1.0 lb. of settling aid should be used per gallon of residuum charged.

A further modification of this invention is to produce continuously the propane-insoluble asphaltic phase to be used as the settling aid by diverting a small proportion of the residual stock being charged to the deasphalting tower and mixing this diverted stream with the total fresh propane charge at a relatively low treating temperature, e. g., 120° F., followed by routing this mixture to a settler from which the desired high softening point, relatively oil-free asphaltic phase is withdrawn as the bottom stream. This stream is then injected near the top of the deasphalting tower to serve as the settling aid as previously described. The upper stream withdrawn from the settler comprises virtually the total propane charge plus a small amount of dissolved oil, and this stream is charged to the lower part of the deasphalting tower in the usual manner. The success of this particular refinement is due to: (1) the very high propane dilution existing in the settler under these conditions (perhaps as high as 50 vols.) which assures an asphalt which is very nearly oil-free and propane-insoluble (under the conditions prevailing at the top of the countercurrent deasphalting tower); (2) the rapid settling rate which is obtained in the settler under these conditions and which means that only a relatively small settler is required; and (3) the simplicity of the single settler circuit.

The propane dilution to be used in making this settling aid from an asphalt-containing residuum should be at least 10 volumes and preferably at least 20 volumes of propane per volume of residuum.

This invention relating to improved propane treating tower operation may be applied to the removal of asphalt-like impurities or constituents from oils of various types, but is especially adapted to the deasphalting of residual petroleum oils left as distillation residues after the removal of lighter fractions such as gasoline, kerosene, and light lubricating oils from various types of crudes, such as paraffinic, naphthenic, Mid-Continent and asphaltic, especially from paraffinic crudes. These crude residua should normally have a viscosity of at least 100 seconds Saybolt Universal at 210° F., and preferably between the approximate limits of 200 to 1200 seconds at 210° F.

The diluent liquid or precipitant should preferably be propane but may also be one or more of the liquefied gaseous hydrocarbons having less than 5 carbon atoms, such as butane, ethane, etc., or mixtures thereof.

The temperature maintained in the various parts of the deasphalting tower will, of course, depend to some extent upon the viscosity and other properties of the stock being treated and the properties desired in the products from the tower operation as well as upon the pressure maintained on the entire system which will generally be at least 400 lbs./sq. inch and usually between about 200 to 600 lbs./sq. inch above atmospheric. The propane-charge stock dilution ratio should range from about 3:1 to 10:1, preferably about 5:1 to 8:1.

In carrying out the invention by using the modification in which a small proportion of very high melting point asphalt is separated continuously from a small proportion of the residuum feed, it is ordinarily desirable to divert about 5% to 20%, preferably about 10%, of the original residuum feed for the preparation of the high softening point asphalt to be used as settling aid in the main deasphalting tower. The increase in rate of settling, or the increase in the capacity of the tower, afforded by the application of this invention, will generally be about 20% to 100%, this increase usually being about 25% to 40% when the proportion of residuum feed diverted for the preparation of high softening point asphalt for use as settling aid is about 10% of the total residuum feed.

The invention is especially applicable to propane deasphalting towers in which the temperature gradient between the residuum feed point and top of the towers is at least 15° F. and preferably about 25° to 75° F., and applies particularly to such towers in which the top temperature is maintained between the approximate limits of 150° F. to 180° F.

The objects and advantages of the invention as well as its mode of operation will be better understood from the following description and the accompanying drawing which are given for the sake of illustration.

Referring to the drawing, a residuum oil is fed in through line 1 from a suitable source not shown through temperature control chamber 2 which may be either a heater or cooler as required, and then through three-way valve 3 which passes the major proportion such as 90% of the oil through line 4 and temperature control chamber 5 into the deasphalting tower 6 at a suitable point between the top and bottom of the tower, preferably at or near the mid-way point. In the meantime the valve 3 permits a minor proportion such as about 10% of the residual oil coming through line 1 to pass through line 7 and temperature control chamber 8 into line 9 where it meets the full volume of liquefied propane (fed through line 10) to be used in the deasphalting tower 6. The ratio of the volume of propane in line 10 to the volume of residual oil in line 7 is very high, such as about 20:1 or 40:1 or even as high as 50:1 or higher. The mixture of oil and propane passing through line 9 is then passed into a suitable mixer 11 which may be of any desired type, such as orifice type, centrifugal pump, etc., from whence it passes through line 12 into settler 13 which is maintained at a suitable temperature, e. g., 100° to 140° F., such as 120° F., from which substantially all of the liquefied propane is drawn off from the upper part of the settler through line 14 and charged into the tower 6 at or near the bottom. A suitable temperature gradient is maintained throughout the deasphalting tower 6, as for instance about 120° F. at the bottom, 140° F. at about the mid-point, and about 160° F. at the top by suitable heating coils 15, of which only two are shown in the drawing but it is understood that more may be used throughout the tower if and to the extent necessary. The small amount of high softening point asphalt which is precipitated out from the residual oil coming from line 7 when it contacts with the propane from line 10 is separated from the bulk of the propane in the settler 13 and is drawn off therefrom through line 16 in the form of a viscous liquid or slurry containing generally about 5 to 9 pounds of high softening point asphalt per gallon of said liquid or slurry. This slurry containing the high softening point asphalt is then fed through line 17 into the top of the deasphalting tower 6 where it increases the gravity differential between the upflowing and downflowing phases and therefore accelerates the settling rate and thereby increases the treating capacity of the tower. The deasphalted oil diluted with the upflowing propane is drawn off from the top of the tower through line 18 from which it may then be passed into suitable equipment for recovering the propane from the oil and recycling the propane into the fresh propane feed line 10. The asphalt precipitated in the deasphalting tower 6 settles out at the bottom of said tower and is withdrawn through line 19. As explained previously, another modification of the invention may be used by feeding all of the residual oil directly into the deasphalting tower 6 (without diverting any of it into line 7) and then feeding into the top of the deasphalting tower 6 a suitable extraneous settling aid through line 20 from some suitable source not shown.

It is not intended that this invention be limited to the particular details which have been given merely for the sake of illustration but only by the appended claims in which it is intended to claim all novelty inherent in the invention as well as all modifications coming within the scope and spirit of the invention.

We claim:

1. In the process of treating oils to remove dissolved normally solid constituents therefrom which are insoluble in liquefied normally gaseous hydrocarbons by diluting said oil with a relatively large volume of a liquefied normally gaseous hydrocarbon in a vertical treating tower in which the liquefied gaseous hydrocarbon is fed into the bottom of the tower, the oil is fed in at the middle of the tower and the temperature at the top of the tower is maintained substantially above the temperature in the middle of the tower, the improvement comprising feeding into said tower near the top thereof a small amount of a relatively high-density finely divided solid settling aid insoluble in said liquefied gaseous hydrocarbons.

2. Process according to claim 1 in which the settling aid is asphalt.

3. Process according to claim 1 in which the settling aid is a finely divided normally solid substance having a specific gravity above 1.0 but not above 3.0, and has a softening point at least above the temperature maintained in the top of said treating tower.

4. Process according to claim 1 in which the settling aid is a finely divided solid adsorbent.

5. In the continuous process of deasphalting heavy residual petroleum oils by diluting the same with a relatively large volume of liquefied propane in a vertical tower into which the propane is fed in at the bottom at a temperature of about 120° F. and the oil is fed in at or above the middle of the tower, the oil fed in at the middle of the tower at about 140° F. and the top of the tower maintained at a temperature of about 160° F., the deasphalted oil being withdrawn continuously with the propane at the top of the tower and the precipitated asphalt being withdrawn from the bottom of the tower, the improvement comprising feeding into said propane-deasphalting tower near the top thereof a small amount of high softening point hard asphalt.

6. The process of treating a heavy oil having a viscosity of 150–500 seconds Saybolt Universal at 210° F. which comprises diluting the same with a relatively large volume of liquefied normally gaseous hydrocarbon in an elongated vertical tower having a height to diameter ratio of at least 5:1, feeding said liquefied normally gaseous hydrocarbon into the bottom of said tower at a temperature below the temperature of the middle of the tower, feeding the oil to be treated into said tower at a point substantially distant from the bottom and from the top of the tower, maintaining the liquid at the top of said tower at a temperature substantially above the temperature of the middle of the tower, feeding into said tower near the top thereof a small amount of a normally solid settling aid having a specific gravity above 1.0, being substantially insoluble in said liquefied normally gaseous hydrocarbon and having a softening point substantially above the temperature maintained at the top of said tower, whereby the addition of said settling aid substantially increases the effective specific gravity of the downflowing phase and thereby increases the settling rate and the treating capacity of said tower, and withdrawing the liquefied normally gaseous hydrocarbon and oil freed from precipitable dissolved solids at the top of said tower and withdrawing precipitated solids from the bottom of said tower.

7. In the continuous process of deasphalting a heavy residual petroleum oil by diluting same with at least 5 volumes of liquefied propane per volume of oil in a large vertical deasphalting tower in which liquefied propane is fed in at the bottom at a temperature of about 120° F. and the oil is fed at a temperature of about 140° F. into the tower at a point intermediate between the top and bottom of the tower, and the top of the tower is maintained at a temperature of about 160° F., the propane and deasphalted oil being taken off continuously at the top of the tower and the precipitated asphalt being withdrawn continuously from the bottom of the tower, the improvement comprising diverting about 5% to 20% of the residual oil feed before it enters the tower and passing said diverted portion of oil into a small mixer along with all of the liquefied propane to be used but before it enters the tower passing said mixture to a settling zone where a small amount of high softening point asphalt is settled out and fed into the top of the large deasphalting tower, the liquefied propane, together with the small amount of oil, being withdrawn from the settling zone and passed into the bottom of the large deasphalting tower.

8. Process according to claim 7 in which about 10% of the original residual oil feed is diverted into the small mixer with the propane so that in said mixer the ratio of propane to oil is at least 25:1, and the asphalt removed from the settling zone and fed into the top of the deasphalting tower has a softening point at least as high as 180° F. and a specific gravity of at least 1.03.

ROBERT L. WEEKS.
BURTON C. BELDEN.